(12) United States Patent
Yu et al.

(10) Patent No.: US 11,383,402 B2
(45) Date of Patent: Jul. 12, 2022

(54) METHOD FOR REINFORCING AND ENHANCING BAMBOO/WOOD MATERIALS

(71) Applicants: Zhejiang Academy of Forestry, Zhejiang (CN); Zhejiang Jiahe Bamboo Industry Technology Co., Ltd, Zhejiang (CN)

(72) Inventors: Haixia Yu, Zhejiang (CN); Manping Xu, Zhejiang (CN); Wenfu Zhang, Zhejiang (CN); Xiaowei Zhuang, Zhejiang (CN); Jin Wang, Zhejiang (CN); Xin Pan, Zhejiang (CN)

(73) Assignees: Zhejiang Academy of Forestry, Zhejiang (CN); Zhejiang Jiahe Bamboo Industry Technology Co., Ltd., Zhejiang (CN)

( * ) Notice: Subject to any disclaimer, the term of this patent is extended or adjusted under 35 U.S.C. 154(b) by 30 days.

(21) Appl. No.: 17/028,046

(22) Filed: Sep. 22, 2020

(65) Prior Publication Data

US 2021/0138684 A1 May 13, 2021

(30) Foreign Application Priority Data

Nov. 7, 2019 (CN) .......................... 201911081169.3

(51) Int. Cl.
*B27K 3/50* (2006.01)
*B27K 3/02* (2006.01)
*B27K 3/08* (2006.01)

(52) U.S. Cl.
CPC .............. *B27K 3/50* (2013.01); *B27K 3/0278* (2013.01); *B27K 3/08* (2013.01)

(58) Field of Classification Search
CPC .......... B27K 3/50; B27K 3/52; B27K 3/0278; B27K 3/08; B27K 3/22
See application file for complete search history.

(56) References Cited

U.S. PATENT DOCUMENTS

2007/0131136 A1*  6/2007  Zhang .................... C09D 15/00
106/15.05

OTHER PUBLICATIONS

Azizi, Preparation, Characterization, and Antimicrobial Activities of ZnO Nanoparticles/Cellulose Nanocrystal Nanocomposites, BioResources, 8(2), 2013, p. 1841-1851 (Year: 2013).*

* cited by examiner

*Primary Examiner* — Tabatha L Penny
(74) *Attorney, Agent, or Firm* — HoustonHogle LLP

(57) ABSTRACT

A method for reinforcing and enhancing bamboo/wood materials employs a sulfuric acid hydrolysis method to prepare a nanocellulose dispersion solution; then with the nanocellulose dispersion solution having a certain concentration as a precursor, nano zinc oxide is in-situ produced on the surface of the nanocellulose; and the cellulose dispersion solution is improved by compounding. The obtained treatment solution is impregnated into the pores of bamboo/wood materials in a specific manner to play the role of filling, binding and consolidating the bamboo/wood tissues, so that the treated bamboo/wood materials have enhanced hardness, strength and dimension stability, and significantly-improved mildew- and corrosion-resistance. The method is suitable for the reinforcing and enhancing treatment of wood materials with relatively-loose texture, such as fast-growing wood and wood from a planted forest, and is also suitable for the reinforcement and restoration of slightly-rotten wood materials.

5 Claims, No Drawings

METHOD FOR REINFORCING AND ENHANCING BAMBOO/WOOD MATERIALS

RELATED APPLICATIONS

This application claims priority to Chinese Patent Application No. 201911081169.3, filed on Nov. 7, 2019, which is incorporated herein by reference in its entirety.

TECHNICAL FIELD

The present invention relates to a method for reinforcing and enhancing bamboo/wood materials.

BACKGROUND

With scarce natural forest resources, many countries have large planted forest areas. The fast-growing wood can be logged for use at the maturity stage, but the fast-growing wood has relatively-loose texture, insufficient strength, hardness, and poor mildew- and corrosion-resistance. With wood properties being properly improved, the fast-growing wood can be used to effectively replace the imported, thereby reducing the dependency on the imported wood.

Nanocellulose (CNC), a nanoscale fiber material extracted from natural fibers, has high crystallinity, high strength, large surface area, high reactivity and strong adsorption capacity. Nanocellulose, which can be prepared by a relatively-simple extraction process with abundant raw material sources, has biodegradability, environment-friendliness, biocompatibility, and a strength exceeding that of steel. Therefore, nanocellulose is widely used in the reinforcing treatment for papers, coatings and synthetic materials. With excellent performance, such as strong adsorption capacity and biocompatibility, CNC can be used as a biomimetic consolidation agent for wood. Due to the high specific surface area (SSA) and reactivity, nanomaterials can particularly interact with the wood tissue or interact with each other inside the pores of the wood.

Nano zinc oxide has advantages in ultraviolet light shielding, photocatalysis, antibacterial materials and other aspects. However, due to the high surface energy, nanoparticles will be directly deposited on the surface of wood or tend to agglomerate in the cell cavity. If nanoparticles are dispersed evenly with nanocellulose and then introduced, it is expected to solve this problem.

SUMMARY

The present invention is intended to provide a method for reinforcing and enhancing bamboo/wood materials.

The present invention adopts the following technical solutions.

A method for reinforcing and enhancing bamboo/wood materials is provided, including:

(1) preparation of a nanocellulose dispersion A: mixing fibers derived from cotton wool or cotton linter with a sulfuric acid solution having a concentration of 60% to 70%, and conducting reaction under a 40° C. to 60° C. water bath for 30 minutes (min) to 40 min; then adding an 8 to 10 fold volume of distilled water (the volume of distilled water is 8 to 10 times the volume of the reaction solution) to stop the reaction, and centrifuging the reaction solution at 1,200 revolutions per minute (rpm) for 15 min; placing the obtained precipitate in a dialysis bag, and conducting dialysis in deionized water until the pH is constant; and conducting suction filtration with a 0.22 μm filter membrane, and diluting the obtained filter to a final concentration of 1% to 2% to obtain a nanocellulose dispersion A; where the sulfuric acid solution is used at an amount of 10 mL/g fiber to 40 mL/g fiber; Vsulfuric acid solution mL: Mfiber g=10-40;

(2) preparation of a nano zinc oxide-nanocellulose composite solution B: with the nanocellulose dispersion A as a precursor and protection liquid for nano zinc oxide, adding a $ZnCl_2$ aqueous solution; stirring the resulting mixture under a 60° C. to 80° C. water bath for 10 min to 30 min; and nucleating the generated nano ZnO crystals directly on the cellulose substrate to obtain a nano zinc oxide-nanocellulose composite solution B; where the $ZnCl_2$ has a concentration of 0.1 mmol/L to 1 mmol/L in the prepared mixture of nanocellulose dispersion A and $ZnCl_2$;

(3) preparation of reinforcing treatment solutions: mixing polydimethylsiloxane (PDMS) having a mass concentration of 0.8% to 1.0%, hydroxypropyl cellulose (HPC) having a mass concentration of 1% to 1.5%, alkali lignin having a mass concentration of 0.5% to 1.0%, and phenol formaldehyde resin (PF) having a mass concentration of 3% to 5%, as a reinforcing agent, with the nanocellulose dispersion A (namely, CNC) at the following volume ratios to obtain enhancing treatment solutions a to e, respectively:

a: CNC:PDMS=2:1, pH=8.4, magnetic stirring at room temperature for 60 min;

b: CNC:Lignin=2:1, pH=7.5, magnetic stirring at room temperature for 60 min;

c: CNC:PDMS:Lignin=2:1:1, pH=8.0, magnetic stirring at room temperature for 60 min;

d: CNC:HPC=5:2, high-speed stirring at 10,000 rpm; and e: CNC:PF=1:1, high-speed stirring at 10,000 rpm;

(4) preparation of reinforcing and enhancing treatment solutions 1 to 5: mixing the reinforcing treatment solutions a to e in step (4) with the nano zinc oxide-nanocellulose composite solution B at volume ratios of 1:(0.8-1); and (5) reinforcing and enhancing treatment for bamboo/wood materials: impregnating samples with the enhancing and reinforcing treatment solutions 1 to 5 prepared in step (4) to obtain enhanced and reinforced bamboo/wood materials.

In step (1), the sulfuric acid solution is used at an amount preferably of 18 mL/g fiber to 25 mL/g fiber.

Specifically, in step (5), the impregnation can be conducted in a vacuum vessel with a vacuum degree of 20 mbar for 3 h to 6 h; after the impregnation is completed, the sample is dried at 103° C. to constant weight, and then further impregnated depending on the rotten degree or other expected target conditions of the sample; and 3 to 15 impregnation-drying cycles are conducted.

Alternatively, in step (5), the impregnation is conducted under a pressure of 100 MPa to 200 MPa for 30 min to 60 min; and then microwave drying is conducted after the impregnation is completed.

Still alternatively, in step (5), the impregnation adopts the combined treatment of extra-high-pressure impregnation and high-temperature curing, with an impregnation pressure of 100 MPa to 200 MPa and impregnation time of 30 min to 60 min, where curing is conducted at 150° C. to 160° C. after the impregnation is completed. It should be noted that when the enhancing and reinforcing treatment solution 5 is used, the combined treatment of extra-high-pressure impregnation and high-temperature curing must be adopted.

In the present invention, a sulfuric acid hydrolysis method is adopted to prepare a nanocellulose dispersion solution; then with the nanocellulose dispersion solution having a certain concentration as a precursor and protection liquid, nano zinc oxide is in-situ produced on the surface of the nanocellulose; and the cellulose dispersion solution is improved by compounding. The obtained treatment solution is impregnated into the pores of bamboo/wood materials in a specific manner to play the role of binding and enhancing the bamboo/wood tissues, so that the treated bamboo/wood materials have enhanced hardness, strength and dimension stability, and significantly-improved mildew- and corrosion-resistance. The method of the present invention is suitable for the reinforcing and enhancing treatment of wood materials with relatively-loose texture, such as fast-growing wood and wood from a planted forest, and is also suitable for the enhancement and restoration of slightly-rotten wood materials.

The present invention has the following beneficial effects: The bamboo/wood materials treated by the method of the present invention have enhanced hardness, strength and dimension stability, and significantly-improved mildew- and corrosion-resistance. The method is extremely suitable for the enhancing and reinforcing treatment of bamboo/wood materials with relatively-loose texture, such as fast-growing wood and wood from a planted forest, and is also suitable for the enhancement and restoration of slightly-rotten wood materials.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION

The present invention is further described below in conjunction with specific examples, but the protection scope of the present invention is not limited thereto. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preparation of a Nanocellulose Dispersion A:

Fibers derived from cotton wool were mixed with a sulfuric acid solution having a concentration of 64% (w/w), and reaction was conducted under a 60° C. water bath for 40 min; then 10 fold volume of distilled water was added to stop the reaction, and the reaction solution was centrifuged at 1,200 rpm for 15 min; the obtained precipitate was placed in a dialysis bag, and dialysis was conducted in deionized water until the pH is constant; and suction filtration was conducted with a 0.22 μm filter membrane, and the obtained filter was diluted to a final concentration of 1.2% to obtain a nanocellulose dispersion A; where the sulfuric acid solution was used at an amount of 21 mL/g fiber.

Preparation of a Nano Zinc Oxide-Nanocellulose Composite Solution B:

With the nanocellulose dispersion A as a precursor and protection liquid for nano zinc oxide, a $ZnCl_2$ aqueous solution was added; the resulting mixture was stirred under a 55° C. water bath for 20 min; and the generated nano ZnO crystals were nucleated directly on the cellulose substrate to obtain a nano zinc oxide-nanocellulose composite solution B; where the $ZnCl_2$ has a concentration of 0.5 mmol/L in the mixed solution of nanocellulose dispersion A and $ZnCl_2$.

Preparation of Other Reagents:

CNC: with a concentration of 1% (w/w).
PDMS: with a concentration of 1% (w/w).
HPC: with a concentration of 1% (w/w).
Lignin: with a concentration of 1% (w/w).
PF: with a concentration of 5% (w/w).

Reinforcing treatment solution a: CNC:PDMS=2:1 (pH=8.4), magnetic stirring at room temperature for 60 min.

Reinforcing treatment solution b: CNC:Lignin=2:1 (pH=7.5), magnetic stirring at room temperature for 60 min.

Reinforcing treatment solution c: CNC:Lignin:PDMS-NH=2:1:1 (pH=8.0), magnetic stirring at room temperature for 60 min.

Reinforcing treatment solution d: CNC:HPC=5:2, high-speed stirring at 10,000 rpm.

Reinforcing treatment solution e: CNC:PF=1:1, high-speed stirring at 10,000 rpm.

Reinforcing and enhancing treatment solution 1: reinforcing treatment solution a was mixed with the nano zinc oxide-nanocellulose composite solution B at a volume ratio of 1:0.8.

Enhancing and reinforcing treatment solution 2: reinforcing treatment solution b was mixed with the nano zinc oxide-nanocellulose composite solution B at a volume ratio of 1:0.8.

Reinforcing and enhancing treatment solution 3: reinforcing treatment solution c was mixed with the nano zinc oxide-nanocellulose composite solution B at a volume ratio of 1:0.8.

Reinforcing and enhancing treatment solution 4: reinforcing treatment solution d was mixed with the nano zinc oxide-nanocellulose composite solution B at a volume ratio of 1:0.8.

Reinforcing and enhancing treatment solution 5: reinforcing treatment solution e was mixed with the nano zinc oxide-nanocellulose composite solution B at a volume ratio of 1:0.8.

Example 1: Reinforcing Treatment on Early-Rotten *Pinus massoniana* Wood

Test material: early-rotten *Pinus massoniana* wood (length×width×thickness: 50 mm×50 mm×20 mm).

The reinforcing and enhancing treatment solution 1 was placed in a vacuum reactor, and then a sample was completely immersed in the solution; the reaction system was vacuumized to have a vacuum degree of 20 mbar, and then kept at this vacuum degree for 3 hours (h) to 6 h; the sample was dried at 103° C. to constant weight, and then impregnated once again; and 4 impregnation-drying cycles were conducted. Then, 3 impregnation-drying cycles were conducted with the reinforcing and enhancing treatment solution 3 according to the above steps.

The performance test results for the early-rotten *Pinus massoniana* wood before and after treatment are shown in Table 1:

TABLE 1

| | Performance | Unit | Test method | Before treatment | After treatment | Reinforcement, % |
|---|---|---|---|---|---|---|
| 1 | Hardness (tangential direction) | N | GB/T 1941-2009 | 1360 | 1630 | 19.9 |

TABLE 1-continued

| | Performance | | Unit | Test method | Before treatment | After treatment | Reinforcement, % |
|---|---|---|---|---|---|---|---|
| 2 | Compression perpendicular to the grain of wood | Radial direction | MPa | GB/T 1939-2009 | 21.2 | 25.8 | 21.6 |
| | | Tangential direction | | | 19.8 | 23.2 | 17.2 |
| 3 | Compression parallel to the grain of wood | | MPa | GB/T 1939-2009 | 35.1 | 42.3 | 20.5 |
| 4 | Volumetric shrinkage (air drying) | | % | GB/T 1932-2009 | 11.8 | 9.6 | 18.6 |
| 5 | Density | | g/cm$^3$ | GB/T 1933-2009 | 0.41 | 0.48 | 17.1 |

It can be seen that the treated sample has enhanced hardness and compressive strength, and reduced volumetric shrinkage.

Example 2: Enhancing Treatment for *Phyllostachys edulis* Wood

Test material: Moso bamboo (*Phyllostachys pubescens* Mazel) (length×width×thickness: 50 mm×50 mm×20 mm)

The reinforcing and enhancing treatment solution 2 was placed in a vacuum reactor, and then a sample was completely immersed in the solution; the reaction system was vacuumized to have a vacuum degree of 20 mbar, and then kept at this vacuum degree for 3 h to 6 h; the sample was dried at 103° C. to constant weight, and then impregnated once again; and 8 impregnation-drying cycles were conducted.

The performance test results for the Moso bamboo before and after treatment are shown in Table 2:

TABLE 2

| | Performance | Unit | Test method | Before treatment | After treatment | Reinforcement, % |
|---|---|---|---|---|---|---|
| 1 | Volumetric shrinkage (air drying) | % | GB/T 1932-2009 | 6.2 | 5.6 | 10.7 |
| 2 | Mildew-resistance | level | GB/T 18261-2013 | Infection level: 3, discoloration level: 3 | Infection level: 1, discoloration level: 1 | |

It can be seen that the treated sample has reduced volumetric shrinkage, and significantly-improved mildew-resistance.

Example 3: Reinforcing and Enhancing Treatment for Fast-Growing Poplar Wood

Test material: poplar fast-growing wood (length×width×thickness: 500 mm×50 mm×20 mm)

The reinforcing and enhancing treatment solution 5 was placed in a thick plastic bag, and then the poplar fast-growing wood sample was immersed in the solution; the thick plastic bag was vacuumized and sealed, and then put in ultra-high pressure equipment; impregnation was conducted at 100 MPa to 200 MPa for 30 min; the sample was dried at 103° C. to constant weight, and then further impregnated at 100 MPa to 200 MPa for 40 min; and the sample was taken out for 1 h of standing, and then placed in a 150° C. to 160° C. oven for curing.

The performance test results for the poplar fast-growing wood before and after treatment are shown in Table 3:

TABLE 3

| | Performance | | Unit | Test method | Comparative wood | Treated wood | Reinforcement, % |
|---|---|---|---|---|---|---|---|
| 1 | Hardness | | N | GB/T 1941-2009 | 1530 | 1880 | 22.9 |
| 2 | Compression perpendicular to the grain of wood | Radial direction | MPa | GB/T 1939-2009 | 29.3 | 35.3 | 17.3 |
| | | Tangential direction | | | 26.0 | 31.9 | 22.7 |

TABLE 3-continued

| | Performance | Unit | Test method | Comparative wood | Treated wood | Reinforcement, % |
|---|---|---|---|---|---|---|
| 3 | Volumetric shrinkage (air drying) | % | GB/T 1932-2009 | 14.9 | 12.6 | 15.4 |
| 4 | Density | g/cm$^3$ | GB/T 1933-2009 | 0.41 | 0.46 | 10.9 |
| 5 | Compression parallel to the grain of wood | MPa | GB/T 1939-2009 | 43.1 | 52.2 | 21.1 |
| 6 | Decay-resistance | level | GB/T 13942.1-2009 | level III | level I | |

It can be seen that the treated sample has enhanced hardness and compressive strength, reduced volumetric shrinkage, and significantly-improved corrosion-resistance.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for reinforcing and enhancing bamboo/wood materials, comprising:
   (1) preparation of a nanocellulose dispersion A: mixing fibers derived from cotton wool or cotton linter with a sulfuric acid solution having a concentration of 60% to 70%, and conducting reaction under a 40° C. to 60° C. water bath for 30 min to 40 min to form a reaction solution; then adding distilled water to the reaction solution to stop the reaction and form a diluted reaction solution, and centrifuging the diluted reaction solution at 1,200 rpm for 15 min to obtain a precipitate; placing the precipitate in a dialysis bag, and conducting dialysis in deionized water to form a dialysis fluid until a pH of the dialysis fluid is constant; and conducting suction filtration with a 0.22 micrometer filter membrane to obtain a residue, and diluting the residue to a final concentration of 1% to 2% to obtain the nanocellulose dispersion A; wherein the sulfuric acid solution is used at an amount of 10 mL/g fiber to 40 mL/g fiber;
   (2) preparation of a nano zinc oxide-nanocellulose composite solution B: with the nanocellulose dispersion A as a precursor and protection liquid for nano zinc oxide, adding a $ZnCl_2$ aqueous solution to the nanocellulose dispersion A to prepare a mixture of nanocellulose dispersion A and $ZnCl_2$; stirring the mixture of nanocellulose dispersion A and $ZnCl_2$ under a 60° C. to 80° C. water bath for 10 min to 30 min; and nucleating generated nano ZnO crystals directly on nanocellulose to obtain a nano zinc oxide-nanocellulose composite solution B; wherein the $ZnCl_2$ has a concentration of 0.1 mmol/L, to 1 mmol/L in the prepared mixture of nanocellulose dispersion A and $ZnCl_2$;
   (3) preparation of treatment solutions: mixing polydimethylsiloxane (PDMS) having a mass concentration of 0.8% to 1.0%, hydroxypropyl cellulose (HPC) having a mass concentration of 1% to 1.5%, alkali lignin having a mass concentration of 0.5% to 1.0%, and phenol formaldehyde resin (PF) having a mass concentration of 3% to 5%, as a binder or consolidate, with the nanocellulose dispersion A at the following volume ratios to obtain treatment solutions a to e; respectively:
   a: nanocellulose:PDMS=2:1, pH 8.4, magnetic stirring at room temperature for 60 min;
   b: nanocellulose:Lignin=2:1, pH=7.5, magnetic stirring at room temperature for 60 min;
   c: nanocellulose:PDMS:Lignin=2:1:1, pH=8.0, magnetic stirring at room temperature for 60 min;
   d: nanocellulose:HPC=5:2, high-speed stirring at 10,000 rpm; and
   e: nanocellulose:PF=1:1, high-speed stirring at 10,000 rpm;
   (4) preparation of treatment solutions 1 to 5: mixing the treatment solutions a to e of step (3) with the nano zinc oxide-nanocellulose composite solution B at volume ratios of 1:(0.8-1.0) to obtain treatment solutions 1 to 5, respectively; and
   (5) treatment for bamboo/wood materials: impregnating samples with the treatment solutions 1 to 5 prepared in step (4) to obtain treated bamboo/wood materials.

2. The method according to claim 1, wherein the sulfuric acid in step) is used at an amount of 18 mL/g fiber to 25 mL/g fiber.

3. The method according to claim 1, wherein, the impregnation in step (5) is conducted in a vacuum vessel with a vacuum 20 mbar for 3 hours to 6 hours; after the impregnation is completed, the sample is dried at 103° C. to constant weight, and then further impregnated depending on a rotten condition or other expected target conditions of the bamboo/wood materials; and 3 to 15 impregnation-drying cycles are conducted.

4. The method according to claim 1, wherein, the impregnation in step (5) is conducted under a pressure of 100 MPa to 200 MPa for 30 min to 60 min; and then microwave drying is conducted alter the impregnation is completed.

5. The method according to claim 1, wherein, the impregnation in step (5) adopts the combined treatment of extra-high-pressure impregnation and high-temperature curing, with an impregnation pressure of 100 MPa to 200 MPa and impregnation time of 30 min to 60 min, wherein curing is conducted at 150° C. to 160° C. after the impregnation is completed.

* * * * *

UNITED STATES PATENT AND TRADEMARK OFFICE
CERTIFICATE OF CORRECTION

PATENT NO. : 11,383,402 B2
APPLICATION NO. : 17/028046
DATED : July 12, 2022
INVENTOR(S) : Haixia Yu et al.

It is certified that error appears in the above-identified patent and that said Letters Patent is hereby corrected as shown below:

In the Claims

In Claim 2, Column 8, Line 38, delete "acid in step) is used at an amount of 18 mL/g fiber to 25" and insert -- acid in step (1) is used at an amount of 18 mL/g fiber to 25 --;

In Claim 4, Column 8, Line 51, delete "drying is conducted alter the impregnation is completed." and insert -- drying is conducted after the impregnation is completed. --.

Signed and Sealed this
Thirtieth Day of August, 2022

Katherine Kelly Vidal
*Director of the United States Patent and Trademark Office*